(12) United States Patent
Fu

(10) Patent No.: US 9,588,569 B2
(45) Date of Patent: Mar. 7, 2017

(54) POWER SAVING METHOD OF OPERATING A PORTABLE COMPUTING DEVICE

(71) Applicant: mCube, Inc., San Jose, CA (US)

(72) Inventor: ChengLong Fu, Taipei (TW)

(73) Assignee: mCube, Inc., San Jose, CA (US)

( * ) Notice: Subject to any disclaimer, the term of this patent is extended or adjusted under 35 U.S.C. 154(b) by 277 days.

(21) Appl. No.: 14/223,903

(22) Filed: Mar. 24, 2014

(65) Prior Publication Data

US 2015/0268714 A1  Sep. 24, 2015

(51) Int. Cl.
| | |
|---|---|
| G06F 1/26 | (2006.01) |
| G06F 1/32 | (2006.01) |
| G06F 1/16 | (2006.01) |
| G06F 3/0488 | (2013.01) |
| G06F 3/0481 | (2013.01) |
| G06F 17/30 | (2006.01) |
| G06F 3/0484 | (2013.01) |

(52) U.S. Cl.
CPC .......... *G06F 1/3234* (2013.01); *G06F 1/1605* (2013.01); *G06F 3/0481* (2013.01); *G06F 3/0484* (2013.01); *G06F 3/0488* (2013.01); *G06F 17/30038* (2013.01)

(58) Field of Classification Search
CPC .... G06F 1/1605; G06F 1/3234; G06F 3/0481; G06F 3/0488; G06F 17/30038; G06F 3/0484

USPC ................................ 713/300, 320, 323, 324
See application file for complete search history.

(56) References Cited

U.S. PATENT DOCUMENTS

| | | | | |
|---|---|---|---|---|
| 7,637,859 | B2 * | 12/2009 | Lindback | A61B 5/4809 600/28 |
| 2014/0108842 | A1 * | 4/2014 | Frank | G06F 17/28 713/323 |

* cited by examiner

*Primary Examiner* — Michael J Brown
(74) *Attorney, Agent, or Firm* — Richard T. Ogawa; Ogawa P.C.

(57) ABSTRACT

A portable computing device using power consumption reduction and a method of operating therefor. The method can include the following steps: determining, in a sensor in the portable computing device, orientation changes of the portable computing device; determining, in the portable computing device, a status of a first operation of the portable computing device; determining, in the portable computing device, a status of a second operation of the portable computing device; discontinuing, in the portable computing device, the second operation in response to when the orientation changes of the portable computing device are less than a threshold, and in response to the status of the first operation and the status of the second operation; and outputting, on a display of the portable computing device, an indication to a user that the second operation has been discontinued.

20 Claims, 22 Drawing Sheets

POWER SAVING METHOD OF OPERATING A PORTABLE COMPUTING DEVICE

CROSS-REFERENCES TO RELATED APPLICATIONS

N/A

BACKGROUND OF THE INVENTION

The present invention is directed to MEMS (Micro-Electro-Mechanical-Systems). More specifically, embodiments of the invention provide methods and structure for improving integrated MEMS devices, including inertial sensors and the like.

Research and development in integrated microelectronics have continued to produce astounding progress in CMOS and MEMS. CMOS technology has become the predominant fabrication technology for integrated circuits (IC). MEMS, however, continues to rely upon conventional process technologies. In layman's terms, microelectronic ICs are the "brains" of an integrated device which provides decision-making capabilities, whereas MEMS are the "eyes" and "arms" that provide the ability to sense and control the environment. Some examples of the widespread application of these technologies are the switches in radio frequency (RF) antenna systems, such as those in the iPhone™ device by Apple, Inc. of Cupertino, Calif., and the Blackberry™ phone by Research In Motion Limited of Waterloo, Ontario, Canada, and accelerometers in sensor-equipped game devices, such as those in the Wii™ controller manufactured by Nintendo Company Limited of Japan. Though they are not always easily identifiable, these technologies are becoming ever more prevalent in society every day.

Beyond consumer electronics, use of IC and MEMS has limitless applications through modular measurement devices such as accelerometers, gyroscopes, actuators, and sensors. In conventional vehicles, accelerometers and gyroscopes are used to deploy airbags and trigger dynamic stability control functions, respectively. MEMS gyroscopes can also be used for image stabilization systems in video and still cameras, and automatic steering systems in airplanes and torpedoes. Biological MEMS (Bio-MEMS) implement biosensors and chemical sensors for Lab-On-Chip applications, which integrate one or more laboratory functions on a single millimeter-sized chip only. Other applications include Internet and telephone networks, security and financial applications, and health care and medical systems. As described previously, ICs and MEMS can be used to practically engage in various type of environmental interaction.

Although highly successful, ICs and in particular MEMS still have limitations. Similar to IC development, MEMS development, which focuses on increasing performance, reducing size, reducing power consumption, and decreasing cost, continues to be challenging. Additionally, applications of MEMS often require increasingly complex microsystems that desire greater computational power. Unfortunately, such applications generally do not exist. These and other limitations of conventional MEMS and ICs may be further described throughout the present specification and more particularly below.

From the above, it is seen that techniques for improving operation of integrated circuit devices and MEMS are highly desired.

BRIEF SUMMARY OF THE INVENTION

The present invention is directed to MEMS (Micro-Electro-Mechanical-Systems). More specifically, embodiments of the invention provide a portable computing device having a MEMS device and configured using power consumption reduction. Merely by way of example, the MEMS device can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

In an embodiment, the present invention can provide a portable computing device using power consumption reduction and a method of operating therefor. The method can include the following steps: determining, in a sensor in the portable computing device, orientation changes of the portable computing device; determining, in the portable computing device, a status of a first operation of the portable computing device; determining, in the portable computing device, a status of a second operation of the portable computing device; discontinuing, in the portable computing device, the second operation in response to when the orientation changes of the portable computing device are less than a threshold, and in response to the status of the first operation and the status of the second operation; and outputting, on a display of the portable computing device, an indication to a user that the second operation has been discontinued.

The portable computing device can include a processor configured or coupled to a memory programmed to execute the software-implemented method for power consumption reduction as described previously. The portable computing device can be a smartphone, tablet, or other like portable device, and can configured to discontinue or pause various functions that were initiated by the user, but now detected to be idle or not present.

The APS method provides a software solution to disable unnecessary components to increase battery life in a portable computing device, such as a commercially available smartphone or tablet product. This method can be enabled in an android smartphone or tablet platform and can support high resolution (8 g, 14 bit) sensors, such as an accelerometer or the like. The APS software implementation can include a service daemon and APK (application package file). The service daemon can be used for motion detection or other sensor-related detection of physical perturbations. The APS APK can provide a background APK with or without UI (user interface), which can be used as a decision maker for the device.

Various additional objects, features and advantages of the present invention can be more fully appreciated with reference to the detailed description and accompanying drawings that follow.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

The present invention is directed to MEMS (Micro-Electro-Mechanical-Systems). More specifically, embodiments of the invention provide a portable computing device having a MEMS device and configured using power consumption reduction. Merely by way of example, the MEMS device can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

The present invention provides a portable computing device using a power saving algorithm and a method of operating the device therefor. In an embodiment, the power saving algorithm can be Accel-based Power Savings (APS) algorithm. This algorithm or method of power consumption reduction can be realized in a device using an Accelerometer or any other MEMS sensor, and the like. The APS method provides a software solution to disable unnecessary components to increase battery life in a portable computing device, such as a commercially available smartphone or tablet product. This method can be enabled in an android smartphone or tablet platform and can support high resolution (8 g, 14 bit) sensors, such as an accelerometer or the like. The APS software implementation can include a service daemon and APK (application package file). The service daemon can be used for motion detection or other sensor-related detection of physical perturbations. The APS APK can provide a background APK with or without UI (user interface), which can be used as a decision maker for the device.

Power consumption is a huge topic for conventional smartphone and tablet products made commercially available to the public. Improving battery life for these products is often the main focus of addressing power consumption. Embodiments of the present invention provide a power saving benefit through detecting conditions that meet specific criteria to determine whether to put certain components into standby mode or active mode. This allows for power saving to be accomplished across all components within a computing device, from sensors to communications processes to display outputs. In an embodiment, a sensor, such as an accel, can be used to detect user motion to power off unnecessary components in a smartphone/tablet is the user is not using the device or operating the device is a specific manner.

Figure 1:
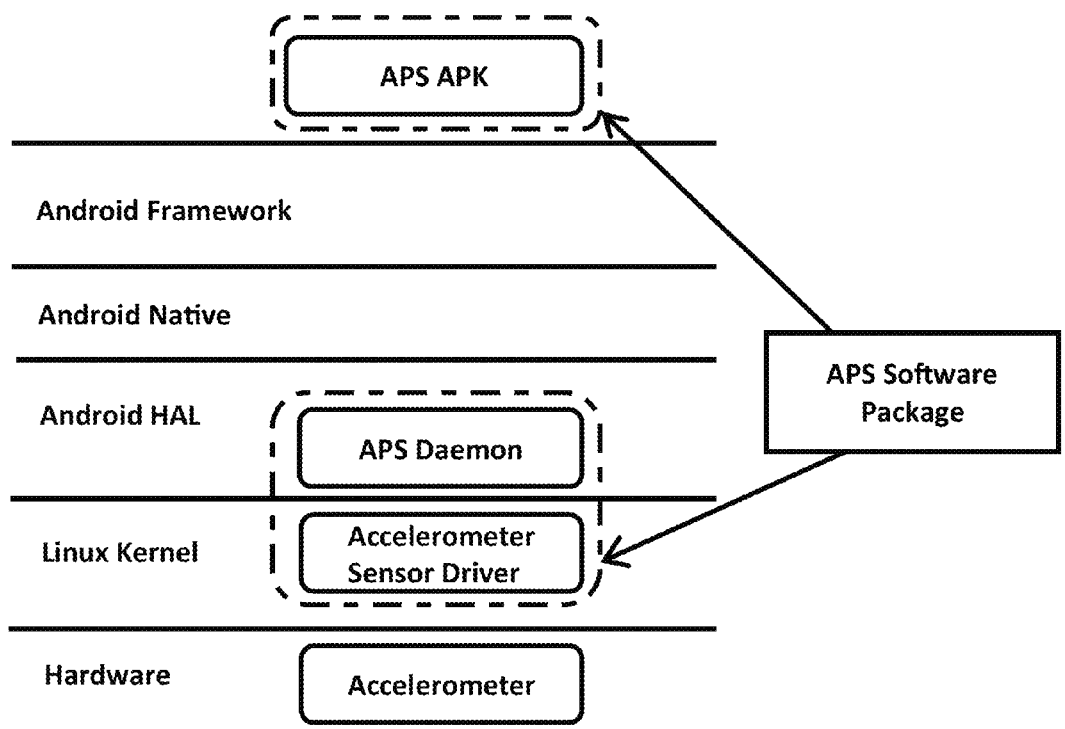
FIG. 1 illustrates a simplified block diagram showing a power saving software architecture according to an embodiment of the present invention.

FIG. 1 illustrates a simplified block diagram showing a power saving software architecture according to an embodiment of the present invention. The software architecture shown can be implemented in a portable computing device, such as a smartphone, tablet, or the like. This framework can be represented in various tiers associated with different functions. For example, physical MEMS sensors, such as magnetometers and gyroscopes, can be associated with the bottom hardware tier.

The software architecture can be utilized or integrated with a software-implemented method configured for power saving related operations through the portable computing device. In a specific embodiment, the method can include an Accel-based Power Savings (APS) method that uses an accelerometer to detect changes in orientation in relation to a predetermined threshold. In various embodiments, the power saving method can be configured using other MEMS sensors, such as a gyroscope, a pressure sensor, a magnetic field sensor, or the like. The software-implemented method can be represented by the "APS Software Package" block in FIG. 1.

The APS software package can be implemented in several tiers within the software architecture. As shown, the software package can include a sensor driver, such as for an accelerometer, a service daemon, such as an APS Daemon, and an APS APK. These three components can be configured to the Linux Kernel, Android HAL (Hardware Abstraction Layer), and application tiers, respectively. Additionally, the software architecture can have other tiers, such as Android Native Interface and Android Framework tiers.

In an embodiment, the present invention includes a method for reducing power consumption in a portable device. The method can include the following steps: determining, in a sensor in the portable computing device, orientation changes of the portable computing device; determining, in the portable computing device, a status of a first operation of the portable computing device; determining, in the portable computing device, a status of a second operation of the portable computing device; discontinuing, in the portable computing device, the second operation in response to when the orientation changes of the portable computing device are less than a threshold, and in response to the status of the first operation and the status of the second operation; and outputting, on a display of the portable computing device, an indication to a user that the second operation has been discontinued.

Figure 2:
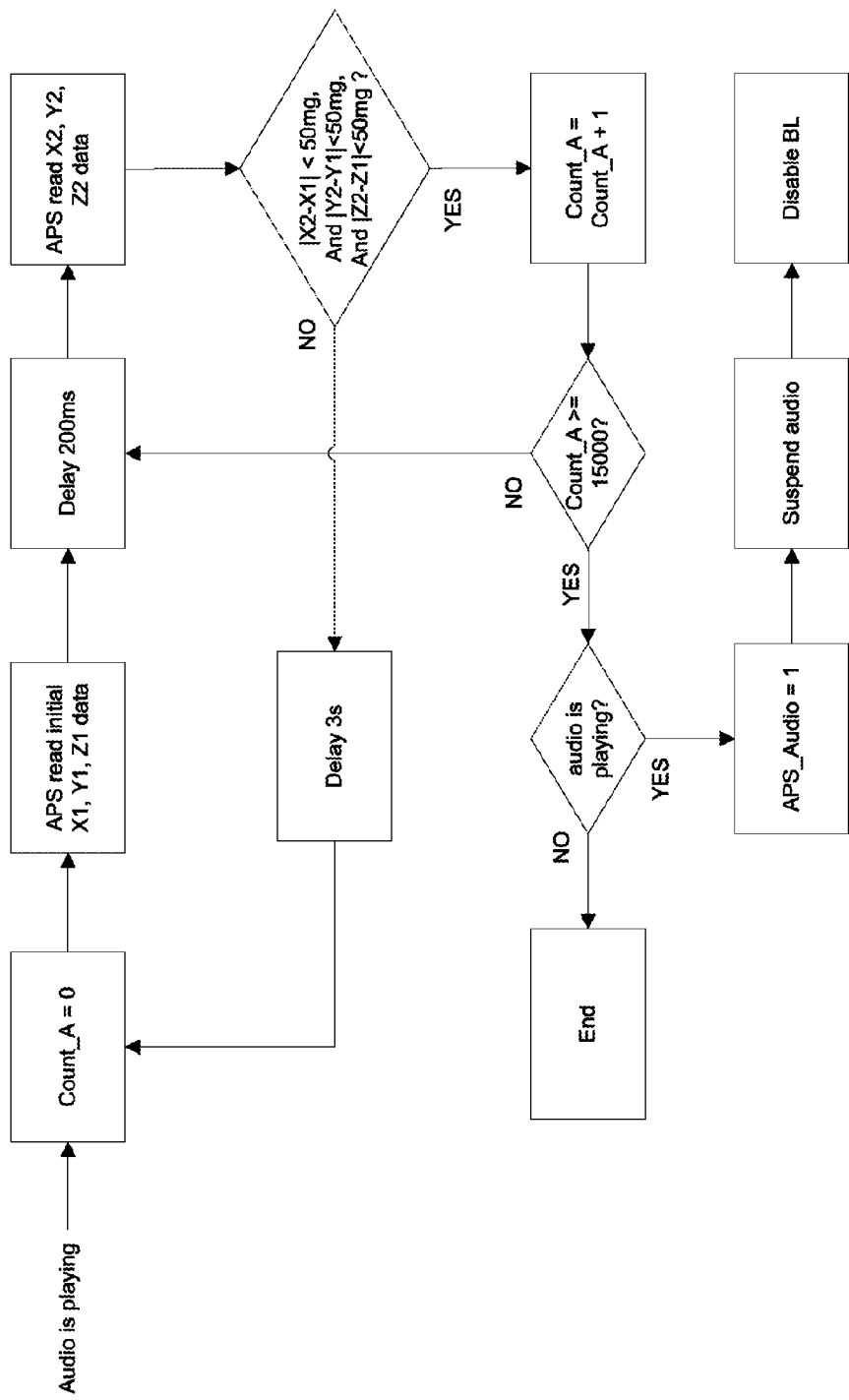
FIG. 2 illustrates a simplified flow diagram showing a software-implemented method for disabling an audio function in a portable computing device programmed to use the software-implemented method according to an embodiment of the present invention.

In a specific embodiment, the first operation can include a display back light operation of the portable computing device and the second operation includes an audio data output operation from the portable computing device. FIG. 2 illustrates a simplified flow diagram showing a software-implemented method for disabling an audio function in a portable computing device programmed to use the software-implemented method according to an embodiment of the present invention. FIG. 2 illustrates an example flow diagram related to the case in which the first operation is the display back light operation and the second operation is the audio data output operation. In this case, discontinuing the second operation can include discontinuing the audio data output operation from the portable computing device in response to when the orientation changes sensed by the sensor is less than a threshold orientation change for a threshold period of time, in response to the display back light operation being inactive, and in response to the audio data output operation being active.

As shown, the method can begin with the audio already playing. A counter "Count_A" can be used to keep track of the number of instances in which the orientation change detected by the sensor, such as an accelerometer, is less than a threshold orientation change. In an example, this counter can be initialized to zero, but incremented whenever the acceleration detected on all of the X, Y, and Z axes is less than 50 mg. The reading of the accelerometer data on each axis can be conducted periodically with delay constants, such as the delay 200 ms and delay 3 s blocks shown. These delays, along with the counter, can effectively create the threshold period of time, which is represented by the counter check of >=15000. If the detected acceleration remains under the threshold change for the threshold time, then an audio check is run. If the audio is not playing, then the method ends; if the audio is playing, an APS audio flag is raised, and the audio function is suspended as the backlight is turned off.

Figure 3:
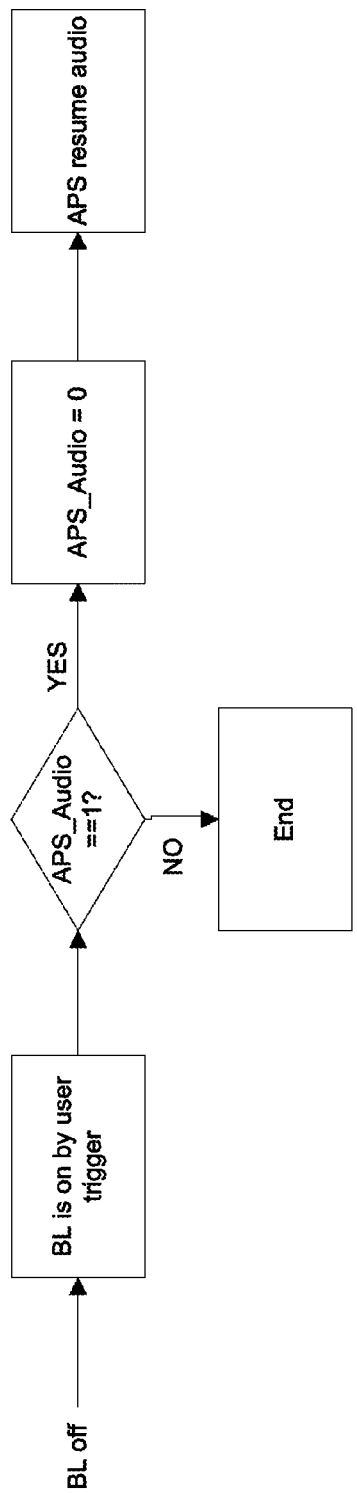
FIG. 3 illustrates a simplified flow diagram showing a software-implemented method for resuming an audio function in a portable computing device programmed to use the software-implemented method according to an embodiment of the present invention.

The method can include a method to resume the audio data output operation. FIG. 3 illustrates a simplified flow diagram showing a software-implemented method for resuming an audio function in a portable computing device programmed to use the software-implemented method according to an embodiment of the present invention. As shown, when the user triggers the backlight function (i.e. operating or touching the portable computing device), a flag check for the audio is conducted, the APS audio flag is lowered, and the audio function is resumed. By using this software-implemented method, the portable computing device saves power by discontinuing the audio process when device is considered not in use by the user.

Figure 4:
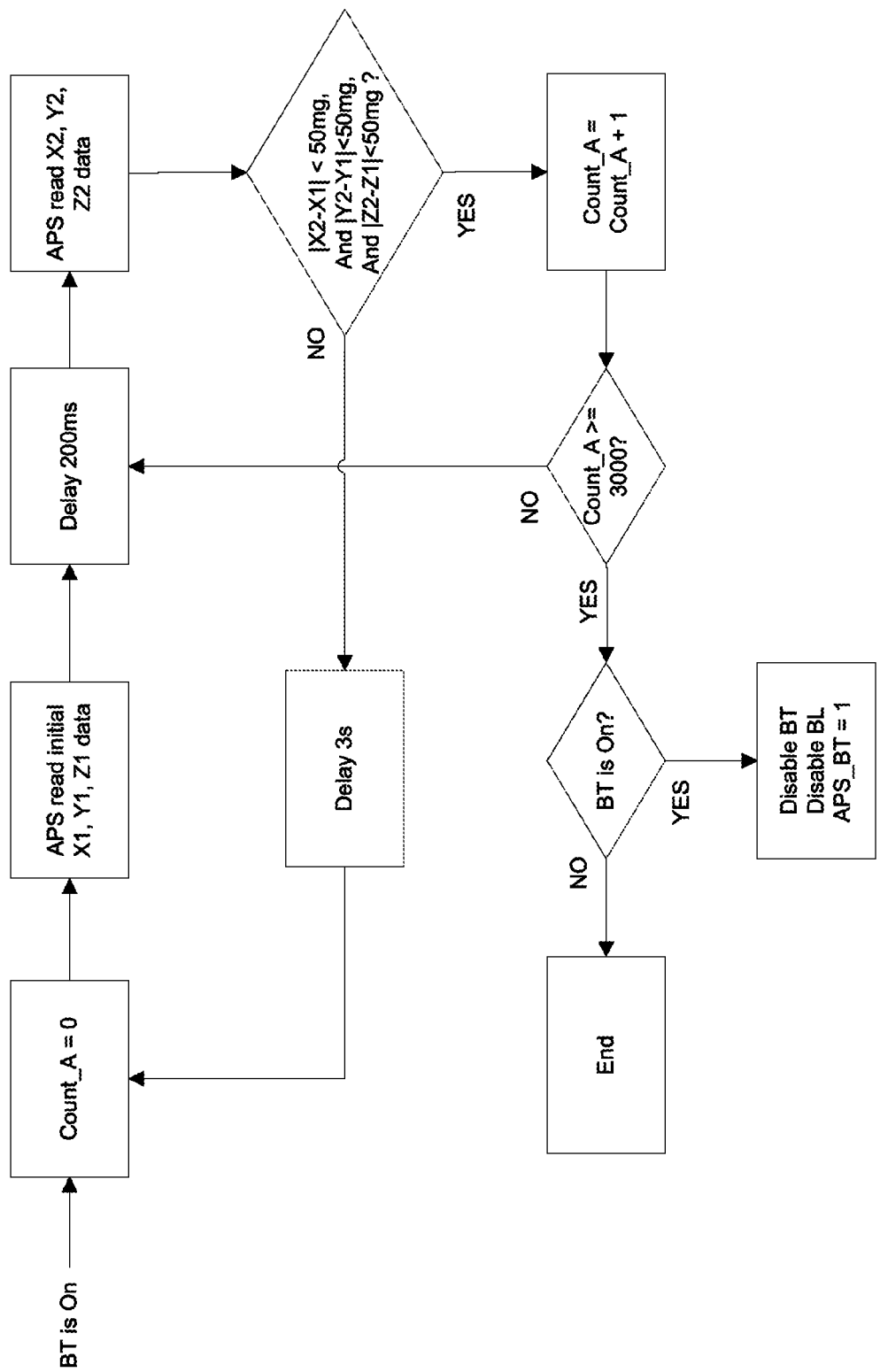
FIG. 4 illustrates a simplified flow diagram showing a software-implemented method for disabling a Bluetooth data communication operations in a portable computing device programmed to use the software-implemented method according to an embodiment of the present invention.

In a specific embodiment, the first operation can include a display back light operation of the portable computing device and the second operation includes Bluetooth data communication operations from the portable computing device. FIG. 4 illustrates a simplified flow diagram showing a software-implemented method for disabling a Bluetooth data communication operations in a portable computing device programmed to use the software-implemented method according to an embodiment of the present invention. This flow diagram is similar to that of FIG. 2, except that the second function is a Bluetooth communication function instead of an audio function. Process steps similar to those described in FIG. 2 are also present in FIG. 4. Here, discontinuing the second operation includes discontinuing Bluetooth data communication operations from the portable computing device in response to when the orientation changes sensed by the sensor is less than a threshold orientation change, in response to the display back light operation being inactive, and in response to the Bluetooth data communication operations being active.

Figure 5:
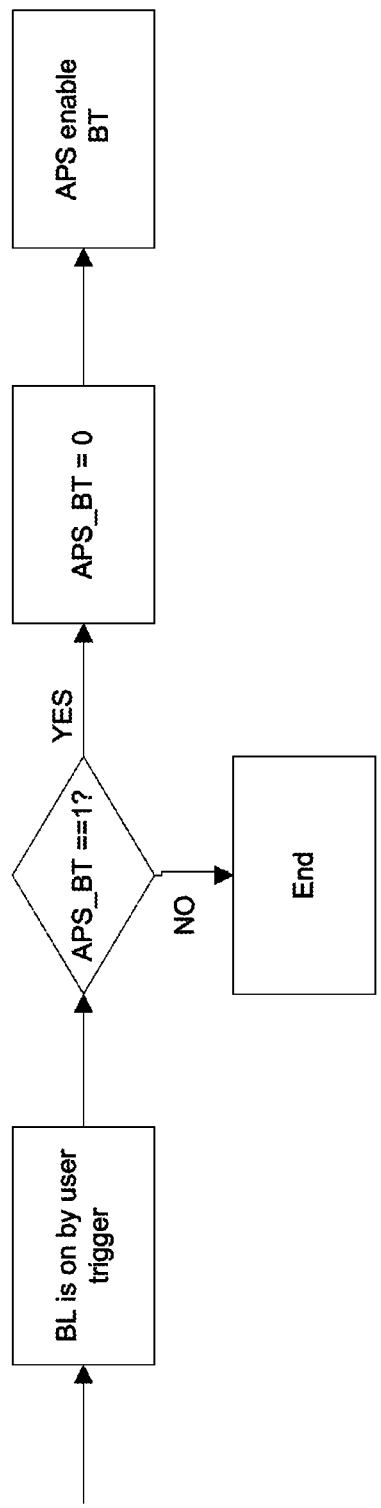
FIG. 5 illustrates a simplified flow diagram showing a software-implemented method for resuming a Bluetooth data communication operations in a portable computing device programmed to use the software-implemented method according to an embodiment of the present invention.

Similar to FIG. 3, FIG. 5 addresses the process steps for resuming a previously suspended or discontinued process, which is the Bluetooth data communications in this case. FIG. 5 illustrates a simplified flow diagram showing a software-implemented method for resuming a Bluetooth data communication operations in a portable computing device programmed to use the software-implemented method according to an embodiment of the present invention. The process steps described for this figure are similar to those of FIG. 3.

Figure 6:
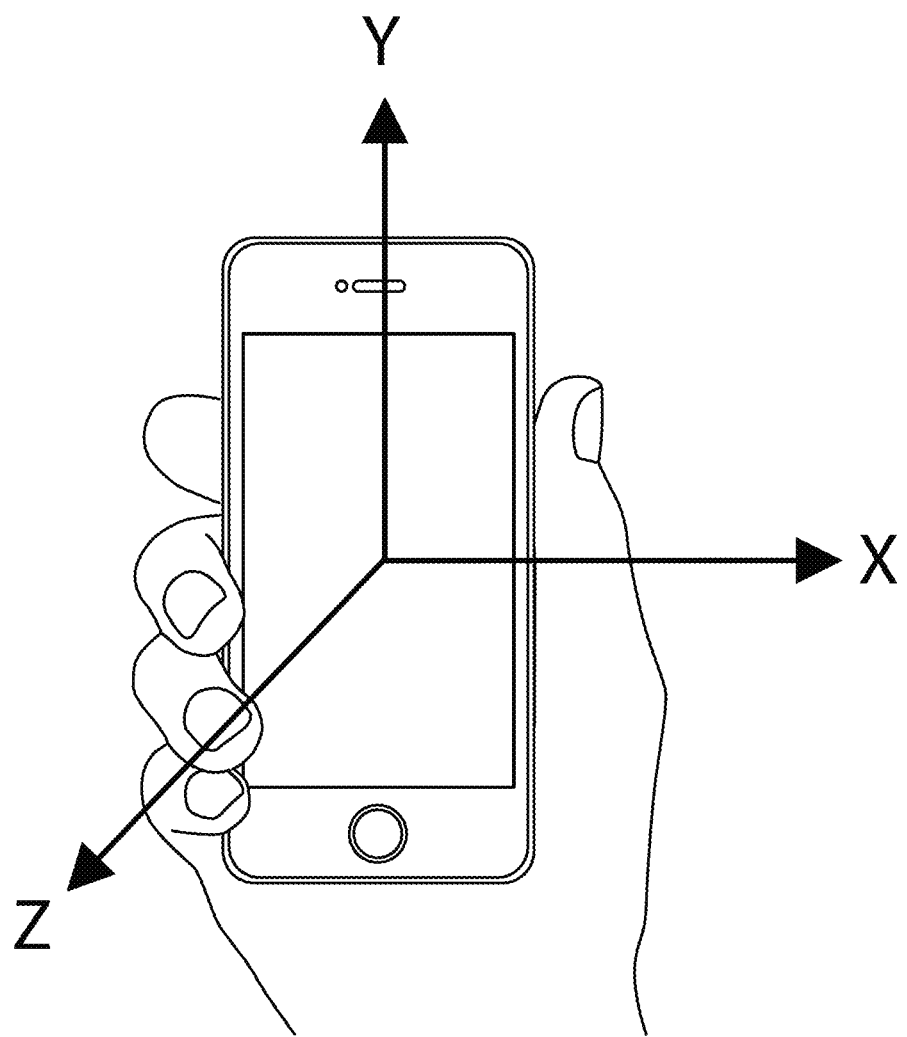
FIG. 6 illustrates a simplified diagram of a handheld portable computing device in a hand of a user according to an embodiment of the present invention.

FIG. 6 illustrates a simplified diagram of a handheld portable computing device in a hand of a user according to an embodiment of the present invention. This figure shows an example configuration of the X, Y, and Z axes in relation to the orientation of the portable computing device. The default axes can be pre-calibrated or recalibrated through a user-initiated process.

Figure 7:
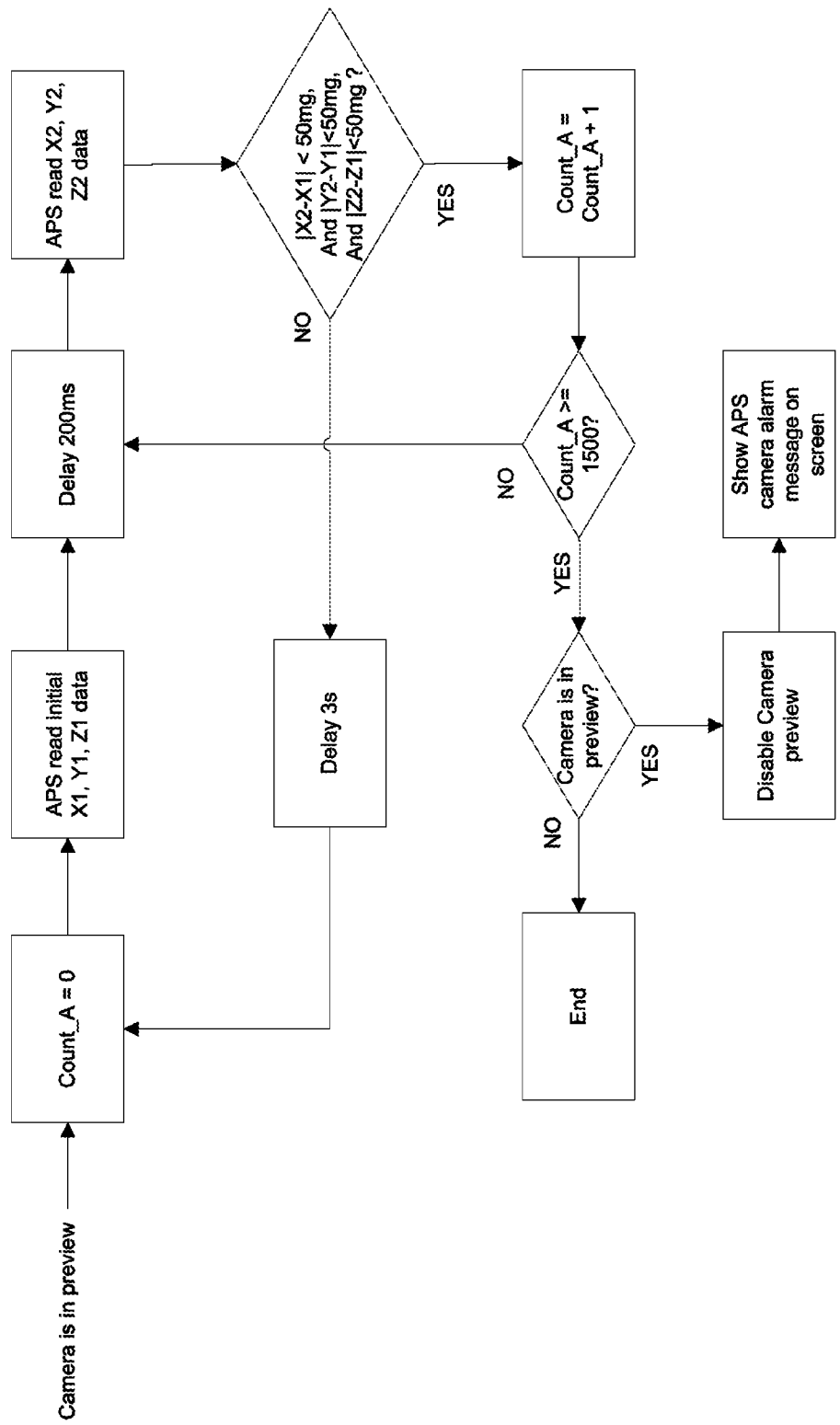
FIG. 7 illustrations a simplified flow diagram showing a software-implemented method for disabling a camera video output operation in a portable computing device programmed to use the software-implemented method according to an embodiment of the present invention.

In a specific embodiment, the first operation can include a timer operation of the portable computing device and the second operation includes a camera video output operation associated with a display in the portable computing device. FIG. 7 illustrations a simplified flow diagram showing a software-implemented method for disabling a camera video output operation in a portable computing device programmed to use the software-implemented method according to an embodiment of the present invention. This flow diagram is similar to that of FIG. 2, except that the first function is a timer function and the second function is a video output function instead of an audio function. Here, discontinuing the second operation includes discontinuing a video display of the camera video output operation on the display in the portable computing system in response to when the orientation changes sensed by the sensor is less than a threshold orientation change, in response to the timer operation indicating a time period when the orientation changes being less than a threshold orientation change exceeds a threshold time, and in response to the camera video output operation being active. One significant difference is the showing of an APS camera alarm message on the screen in the case that the camera preview is being disabled.

Figure 8:
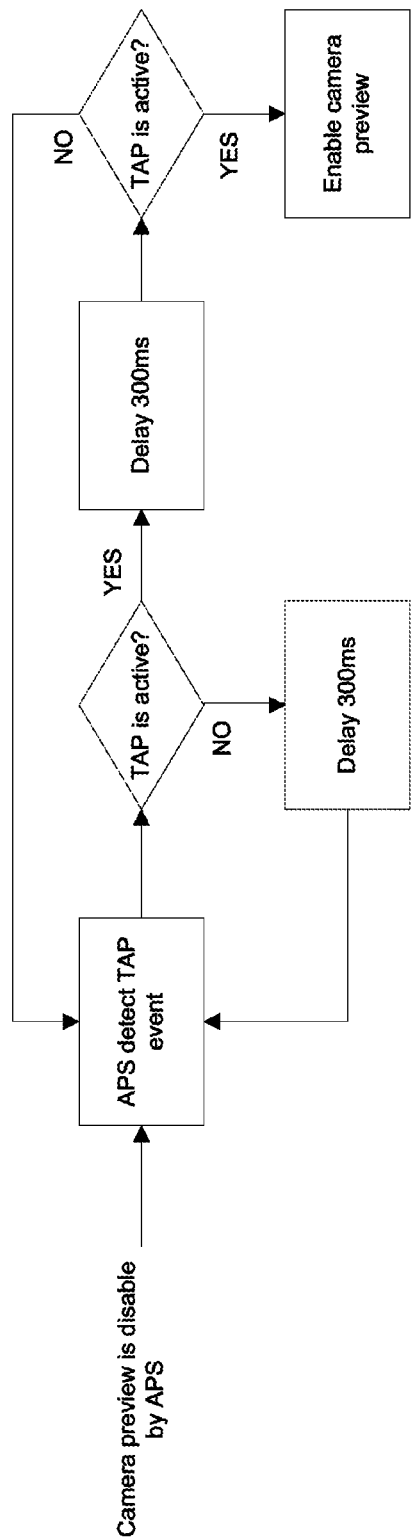
FIG. 8 illustrates a simplified flow diagram showing a software-implemented method for enabling a camera video output operation in a portable computing device programmed to use the software-implemented method according to an embodiment of the present invention.

FIG. 8 illustrates a simplified flow diagram showing a software-implemented method for enabling a camera video output operation in a portable computing device programmed to use the software-implemented method according to an embodiment of the present invention. FIG. 8 describes a process of re-enabling the video display of the camera video output operation described previously in FIG. 7. Here, a tap action from the user is required to re-enable the camera preview.

Figure 9:
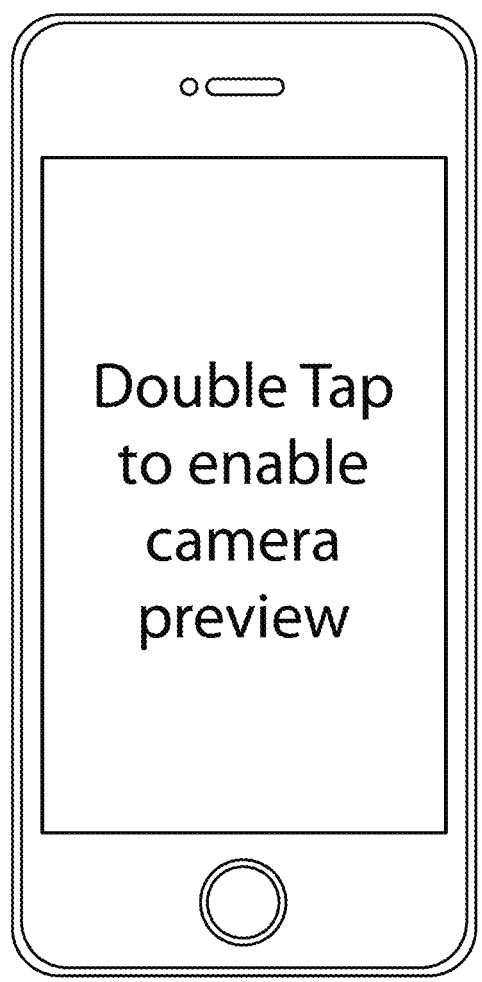
FIG. 9 illustrates a simplified diagram showing a portable computing device displaying a visual message indicating a state of a software-implemented method for enabling a camera video output operation according to an embodiment of the present invention.

FIG. 9 illustrates a simplified diagram showing a portable computing device displaying a visual message indicating a state of a software-implemented method for enabling a camera video output operation according to an embodiment of the present invention. This figure shows an example of the message shown when the camera video output operation is disabled. As shown, the message prompts the user to perform a double-tap action to enable the camera preview. Other messages and UI displays may be used as well.

Figure 10:
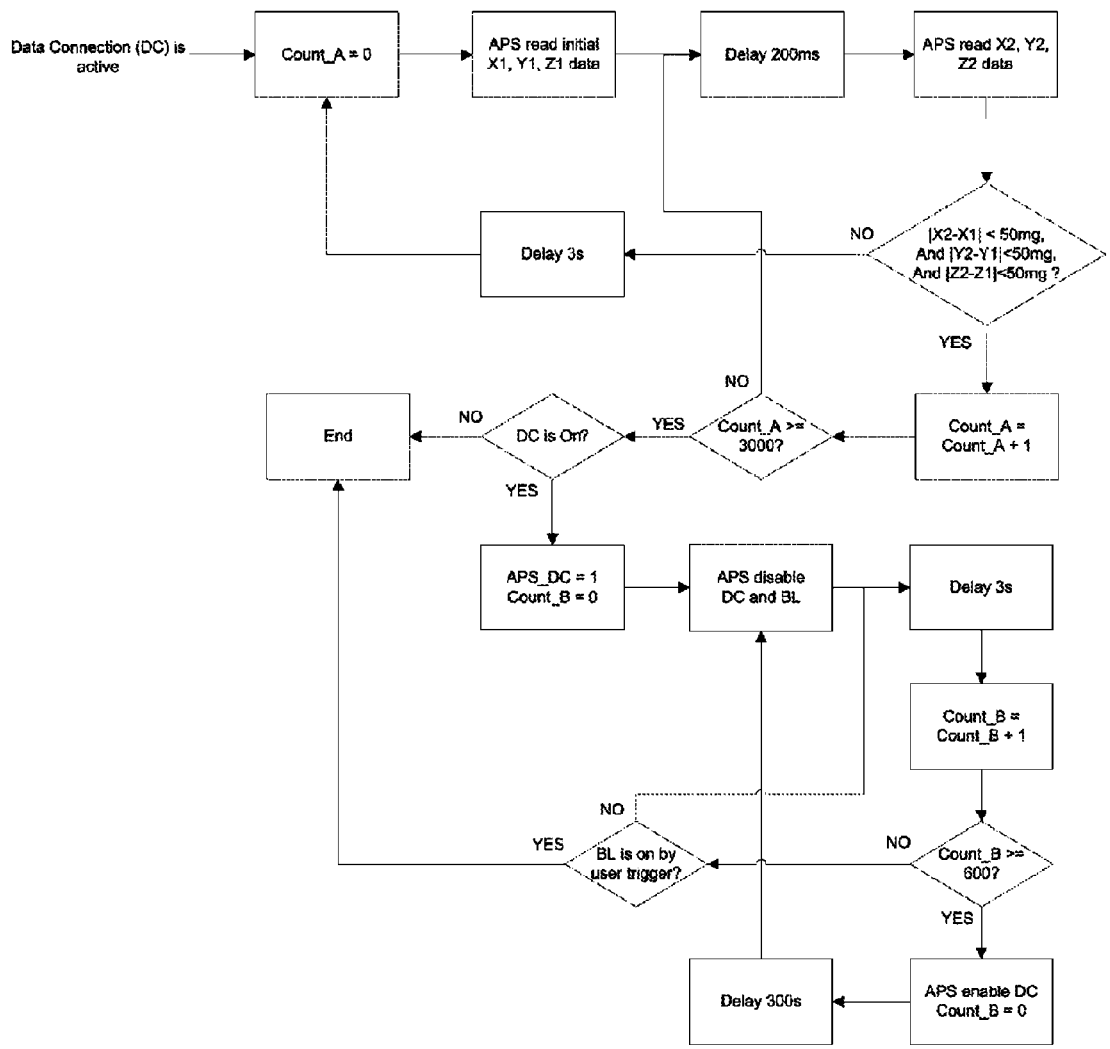
FIG. 10 illustrations a simplified flow diagram showing a software-implemented method for disabling data communications operations in a portable computing device programmed to use the software-implemented method according to an embodiment of the present invention.

In a specific embodiment, the first operation includes a display back light operation of the portable computing device and the second operation includes data communication operations from the portable computing device. The data communication operations can include data communication protocols selected from a group consisting of: GPRS (General Packet Radio Service), 3G, 4G, or the like. FIG. 10 illustrations a simplified flow diagram showing a software-implemented method for disabling data communications operations in a portable computing device programmed to use the software-implemented method according to an embodiment of the present invention. Here, discontinuing the second operation includes discontinuing data communication operations from the portable computing device in response to when the orientation changes sensed by the sensor is less than a threshold orientation change, in response to the display back light operation being inactive, and in response to the data communication operations being active.

In this case, the software-implemented method includes additional process steps compared to the flow diagram of FIG. 2. The first counter, denoted as "Count_A", and the sensor and first counter thresholds are similar to the steps described previously. However, following the condition to disable data communications, there is another process loop involving another counter, denoted as "Count_B". This loop increments the second counter as long as the back light is not triggered by the user and as long as the second counter does not reach the second counter threshold, shown in FIG. 10 as 600. If the second counter reaches the second counter threshold, the data communication operations are resumed for a predetermined time period and the second counter is reset. The predetermined time period is shown as the delay of 300 s, which then loops back to the data communications being disabled and the second counter being incremented. This simulates conducting the data communications at a reduced rate until the user triggers the backlight, which results in the end process.

Figure 11:
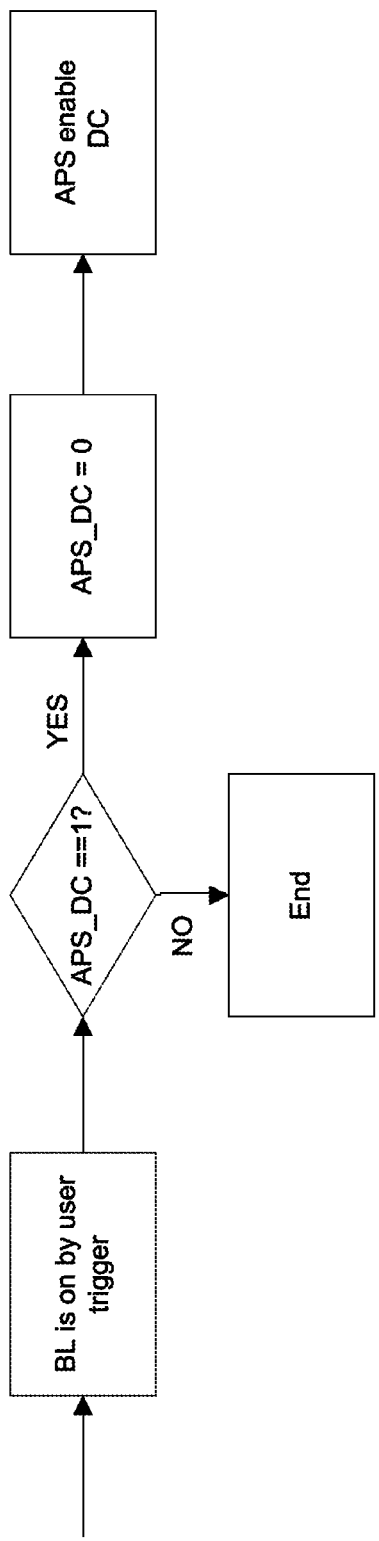
FIG. 11 illustrates a simplified flow diagram showing a software-implemented method for enabling data communications operations in a portable computing device programmed to use the software-implemented method according to an embodiment of the present invention.

FIG. 11 illustrates a simplified flow diagram showing a software-implemented method for enabling data communications operations in a portable computing device programmed to use the software-implemented method according to an embodiment of the present invention. FIG. 11 describes a process of re-enabling data communication operations described previously in FIG. 10. Here, the user triggering the back light causes the normal data communications to resume.

Figure 12:
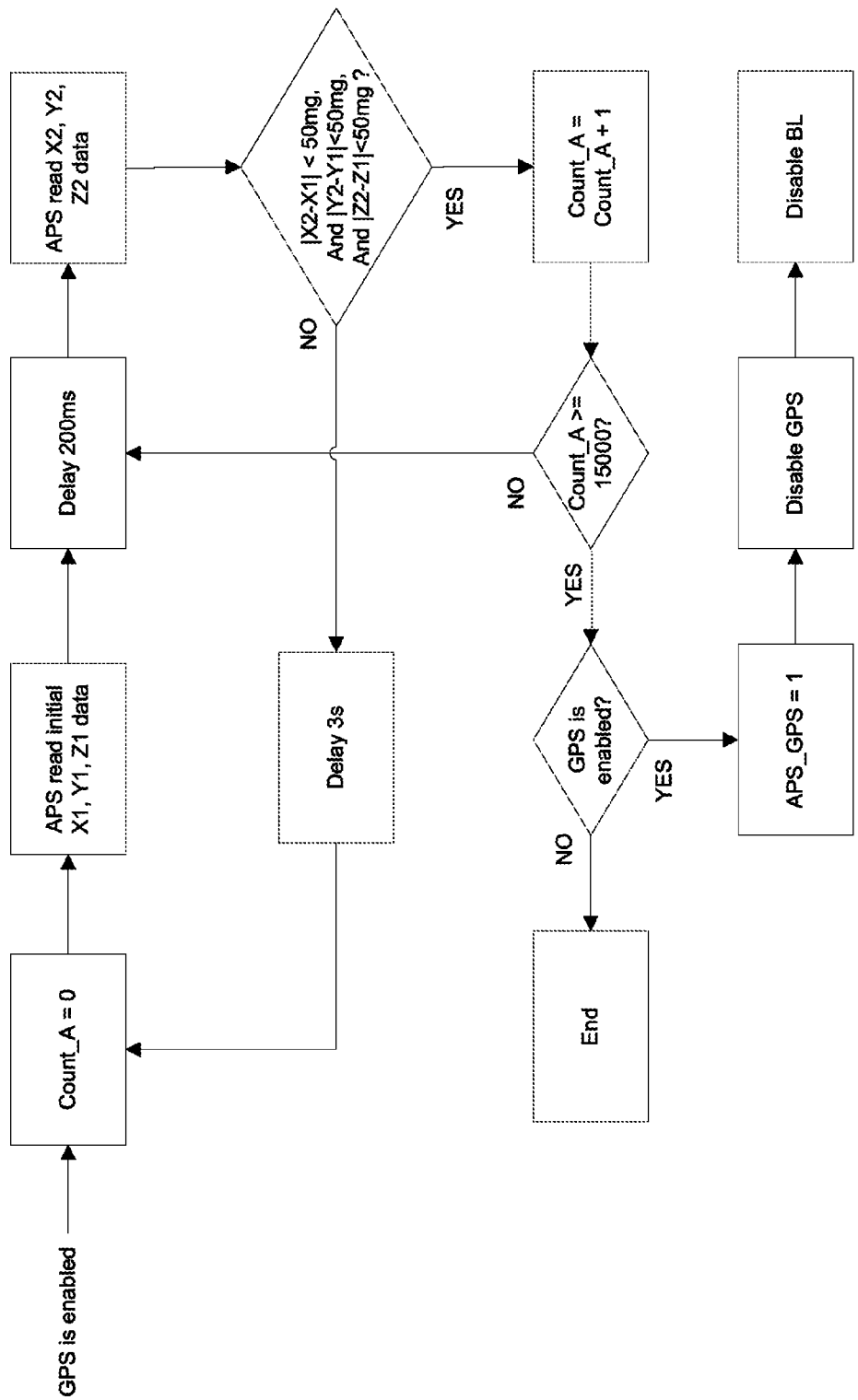
FIG. 12 illustrations a simplified flow diagram showing a software-implemented method for disabling GPS sensing with the portable computing device programmed to use the software-implemented method according to an embodiment of the present invention.

In a specific embodiment, the first operation can include a timer operation of the portable computing device and the second operation includes GPS sensing with the portable computing device. FIG. 12 illustrations a simplified flow diagram showing a software-implemented method for disabling GPS sensing with the portable computing device programmed to use the software-implemented method according to an embodiment of the present invention. This flow diagram is similar to that of FIG. 2, except that the first function is a timer function and the second function is a GPS function instead of an audio function. Here, discontinuing the second operation includes discontinuing GPS sensing with the portable computing system in response to when the orientation changes sensed by the sensor is less than a threshold orientation change, in response to the timer operation indicating a time period when the orientation changes being less than a threshold orientation change exceeds a threshold time, and in response to the GPS sensing being active.

Figure 13:
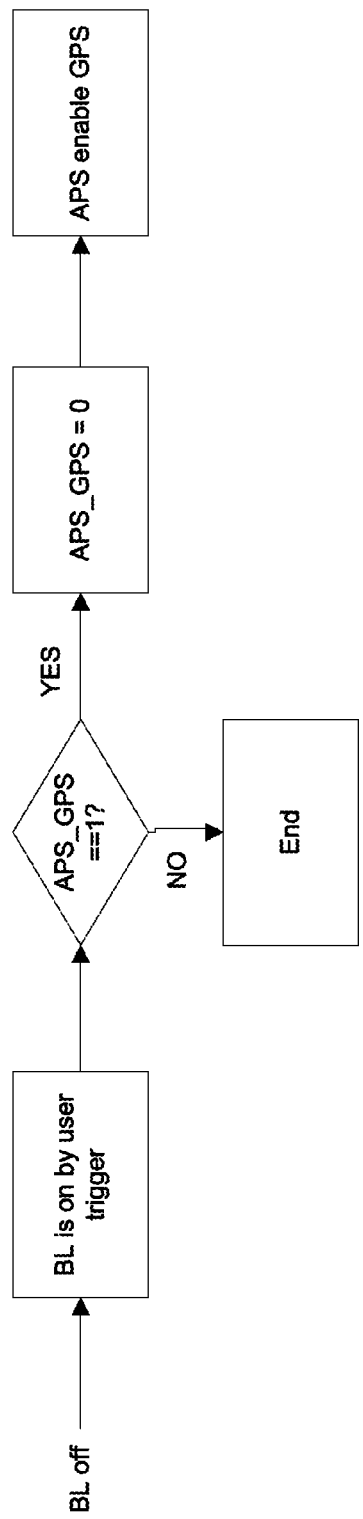
FIG. 13 illustrates a simplified flow diagram showing a software-implemented method for enabling GPS sensing with the portable computing device programmed to use the software-implemented method according to an embodiment of the present invention.

FIG. 13 illustrates a simplified flow diagram showing a software-implemented method for enabling GPS sensing with the portable computing device programmed to use the software-implemented method according to an embodiment of the present invention. FIG. 13 describes a process of re-enabling the GPS sensing described previously in FIG. 12.

Figure 14:
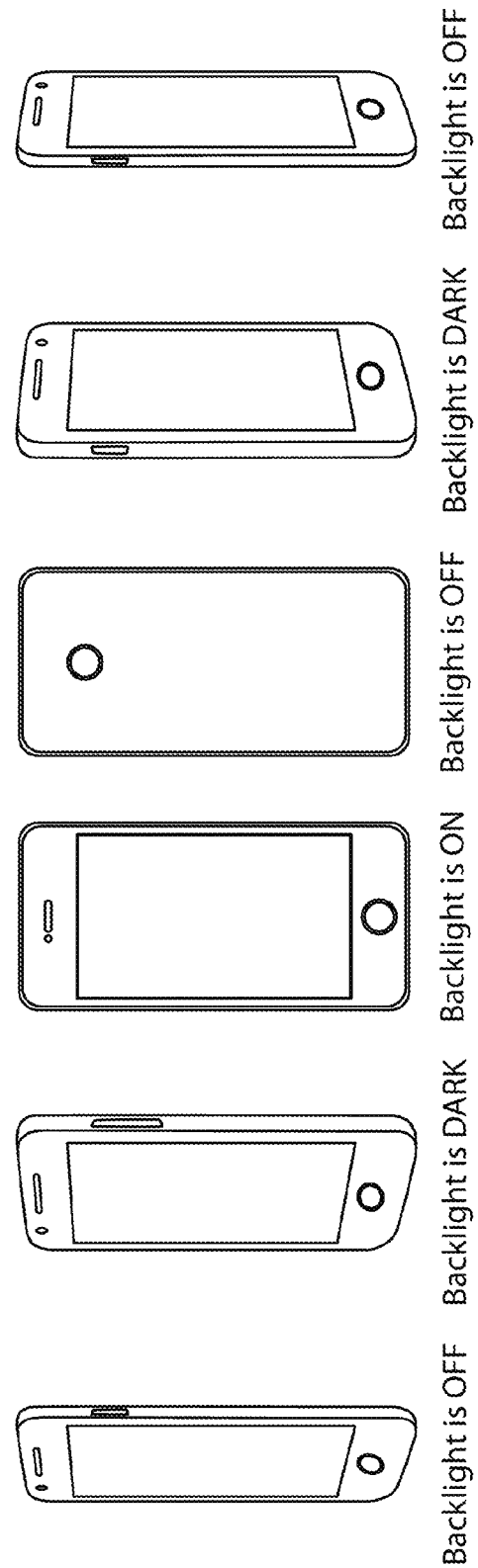
FIGS. 14A-14F illustrates multiple simplified views of a portable computing device showing different states of a backlight operation associated with a software-implemented method according to an embodiment of the present invention.

FIGS. 14A-14F illustrates multiple simplified views of a portable computing device showing different states of a backlight operation associated with a software-implemented method according to an embodiment of the present invention. Each of these figures shows an orientation associated with a state of the back light operation. FIGS. 14A, 14D, and 14F show orientations in which the back light is off. FIGS. 14B and 14E show orientations in which the back light is dark and FIG. 14C shows an orientation in which the back light is on. Other configurations of back light states and spatial orientations can be used and will be recognized by those of ordinary skill in the art.

Figure 15:
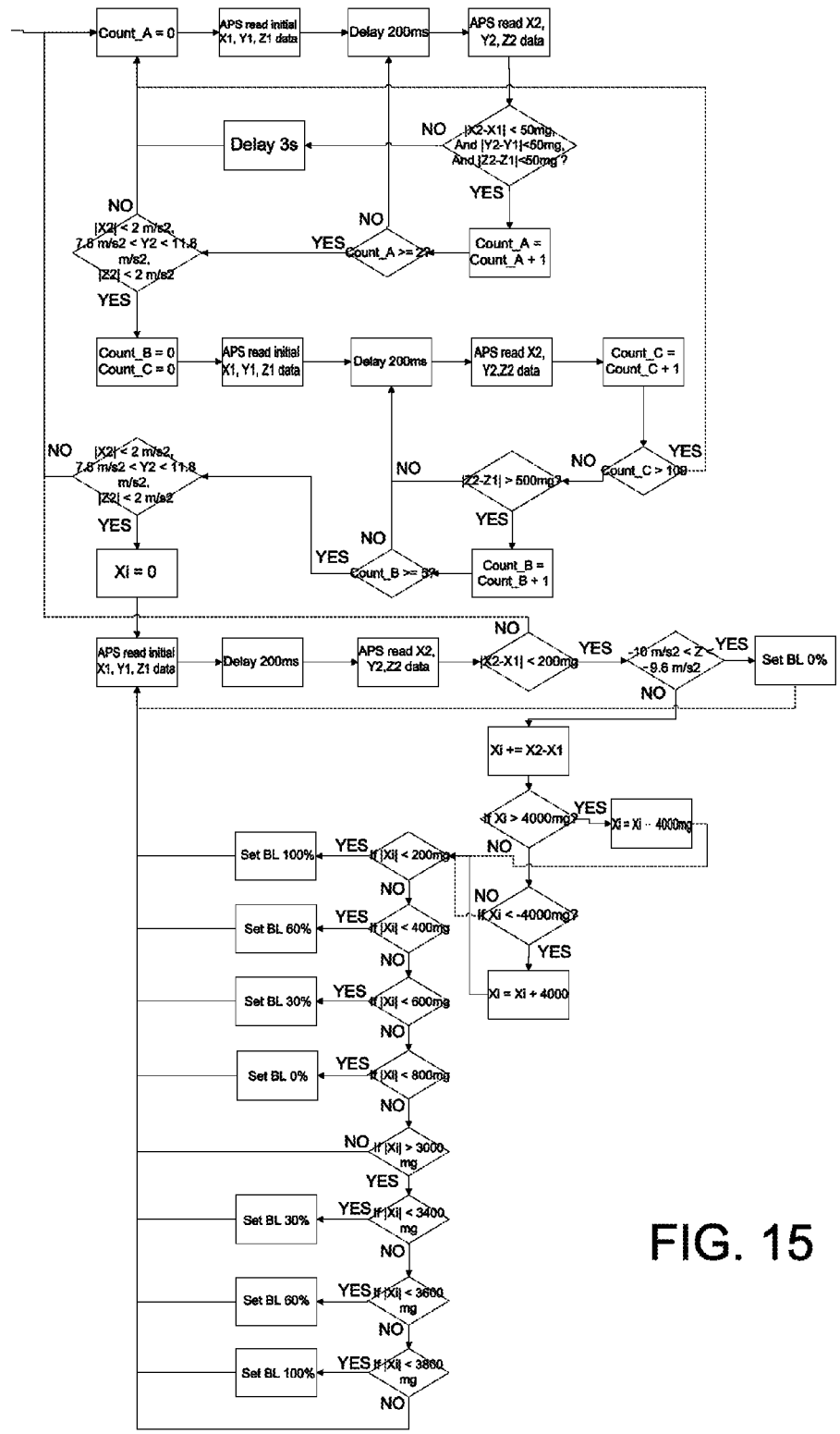
FIG. 15 illustrates a simplified flow diagram showing a software-implemented method for a preset backlight brightness setting of the portable computing device programmed to use the software-implemented method according to an embodiment of the present invention.

In a specific embodiment, the sensor is a camera, the first operation includes a display back light operation of the portable computing device, and the second operation comprises a preset backlight brightness setting of the portable computing device. FIG. 15 illustrates a simplified flow diagram showing a software-implemented method for a preset backlight brightness setting of the portable computing device programmed to use the software-implemented method according to an embodiment of the present invention. Here, discontinuing the second operation includes discontinuing the preset backlight brightness setting of the portable computing device in response to when the camera does not detect a user facing the camera, in response to the display backlight operation being active, and in response to the preset backlight brightness setting being active.

FIG. 15 shows the longest example flow diagram for power saving operations in a portable computing device. As shown, various counters "Count_A", "Count_B", and "Count_C" are used in keeping track of acceleration thresholds according to different criteria. Count_A is incremented cyclically when the acceleration detected on all axes is less than 50 mg. When Count_A reaches its threshold count, the method checks for acceleration thresholds on each axes in $m/s^2$, which then leads to setting either Count_B and Count_C to zero or Count_A to zero. Count_B is incremented when the acceleration detected on the Z-axis is greater than 500 mg. When Count_B reaches its threshold an acceleration check in m/s2 is conducted, and Count_A is set to zero or the method runs another process loop keep track of an acceleration value Xi. The back light brightness setting is set to various degrees of brightness based on the values of Xi, as shown in the bottom portion of the flow diagram. And Count_C is incremented as long as the Z acceleration does not exceed 500 mg and leads to the resetting of Count_A when its threshold is reached. This flow diagram relates to the example orientations shown in FIGS. 14A-14F.

Figure 16:
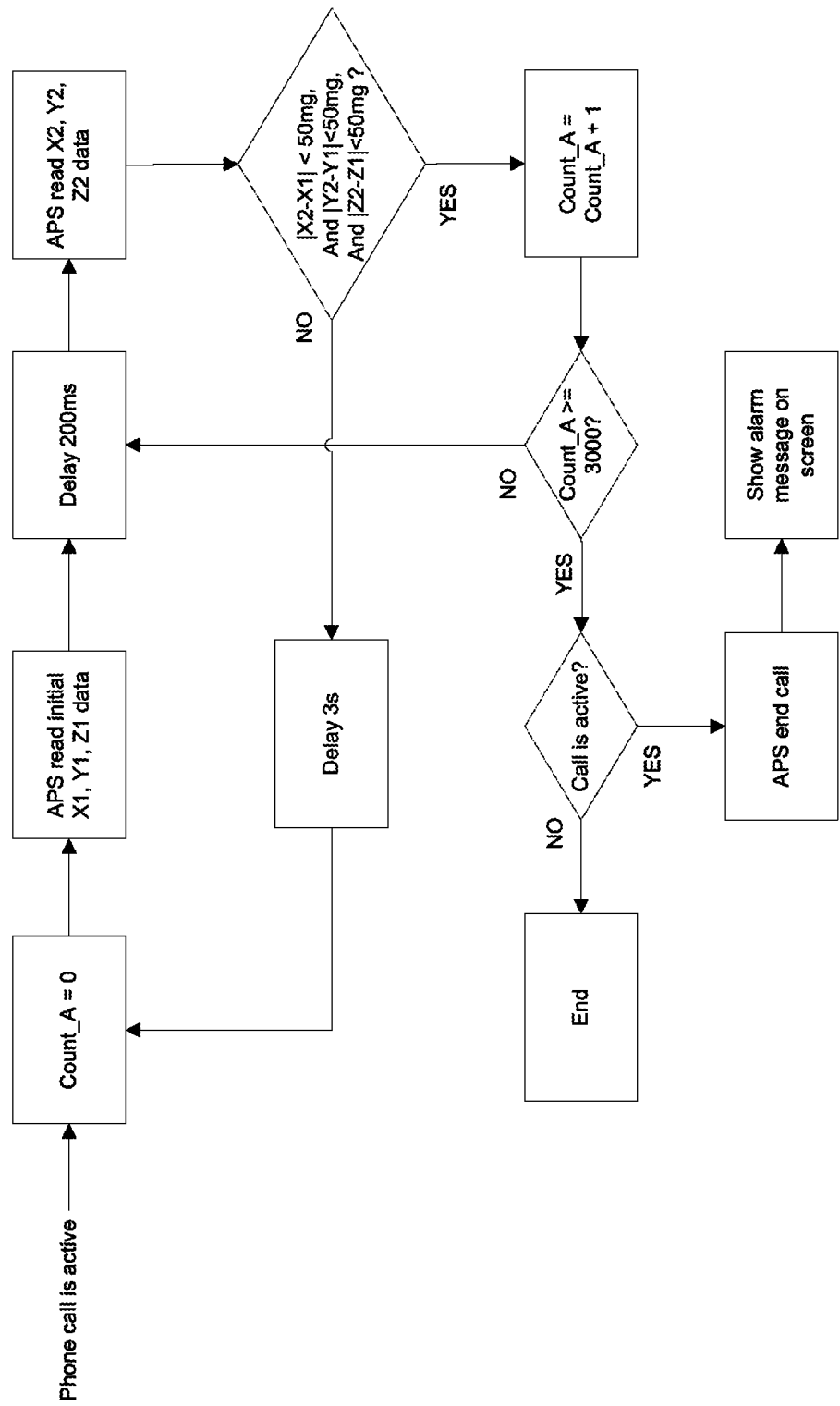
FIG. 16 illustrations a simplified flow diagram showing a software-implemented method for discontinuing a telecommunication operation from the portable computing device programmed to use the software-implemented method according to an embodiment of the present invention.

In a specific embodiment, the first operation can include a timer operation of the portable computing device and the second operation can include a telecommunication operation from the portable device. FIG. 16 illustrations a simplified flow diagram showing a software-implemented method for discontinuing a telecommunication operation from the portable computing device programmed to use the software-implemented method according to an embodiment of the present invention. This flow diagram is similar to that of FIG. 7, except that the second function is a telecommunication function instead of an audio function. Process steps similar to those described in FIG. 7 are also present in FIG. 16. Here, discontinuing the second operation can include discontinuing the telecommunication operation from the portable computing device in response to when the orientation changes sensed by the sensor is less than a threshold orientation change, in response to the timer operation indicating a call exceeding a threshold call time, and in response to the telecommunication operation being active.

Figure 17:
FIG. 17 illustrates a simplified diagram of a portable computing device displaying a visual message indicating a state of a software-implemented method for discontinuing a telecommunication operation from the portable computing device programmed to use the software-implemented method according to an embodiment of the present invention.

FIG. 17 illustrates a simplified diagram of a portable computing device displaying a visual message indicating a state of a software-implemented method for discontinuing a telecommunication operation from the portable computing device programmed to use the software-implemented method according to an embodiment of the present invention. As shown, the portable computing device shows a "DROP CALL" message on the display. Other UI displays and indications can be used as well.

Figure 18:
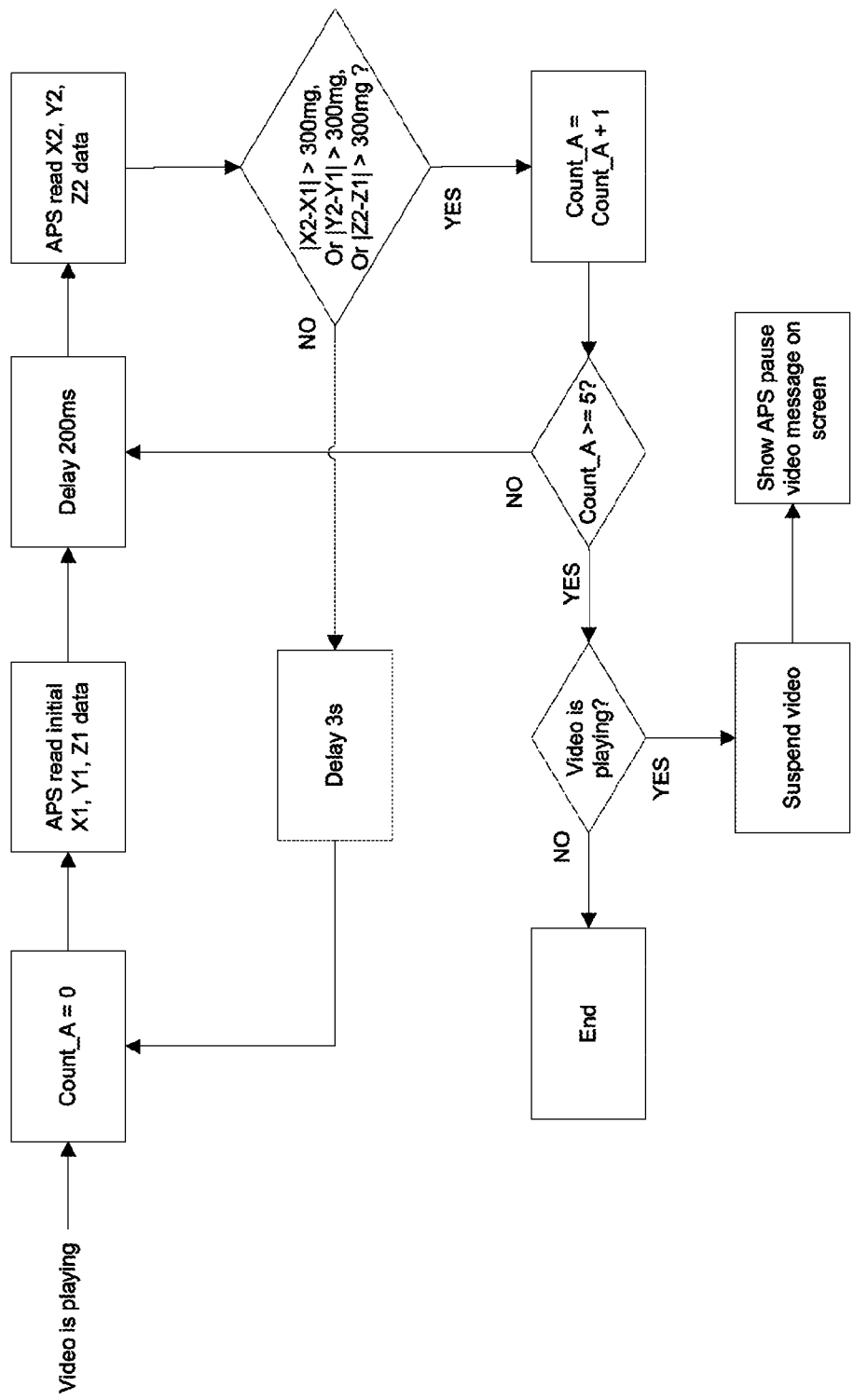
FIG. 18 illustrations a simplified flow diagram showing a software-implemented method for discontinuing a video playback operation on the portable computing device programmed to use the software-implemented method according to an embodiment of the present invention.

In a specific embodiment, the first operation can include a timer operation of the portable computing device and the second operation can include a video playback operation on the portable computing device. FIG. 18 illustrations a simplified flow diagram showing a software-implemented method for discontinuing a video playback operation on the portable computing device programmed to use the software-implemented method according to an embodiment of the present invention. This flow diagram is similar to that of FIG. 7, except that the second function is a telecommunication function instead of an audio function. Process steps similar to those described in FIG. 7 are also present in FIG. 18. Here, discontinuing the second operation includes discontinuing the video playback operation on the portable device in response to when the orientation changes sensed by the sensor is greater than a threshold orientation change, in response to the timer operation indicating a time period when orientation changes being greater than the threshold orientation change exceeds a threshold time, and in response to the video playback operation being active.

Figure 19:
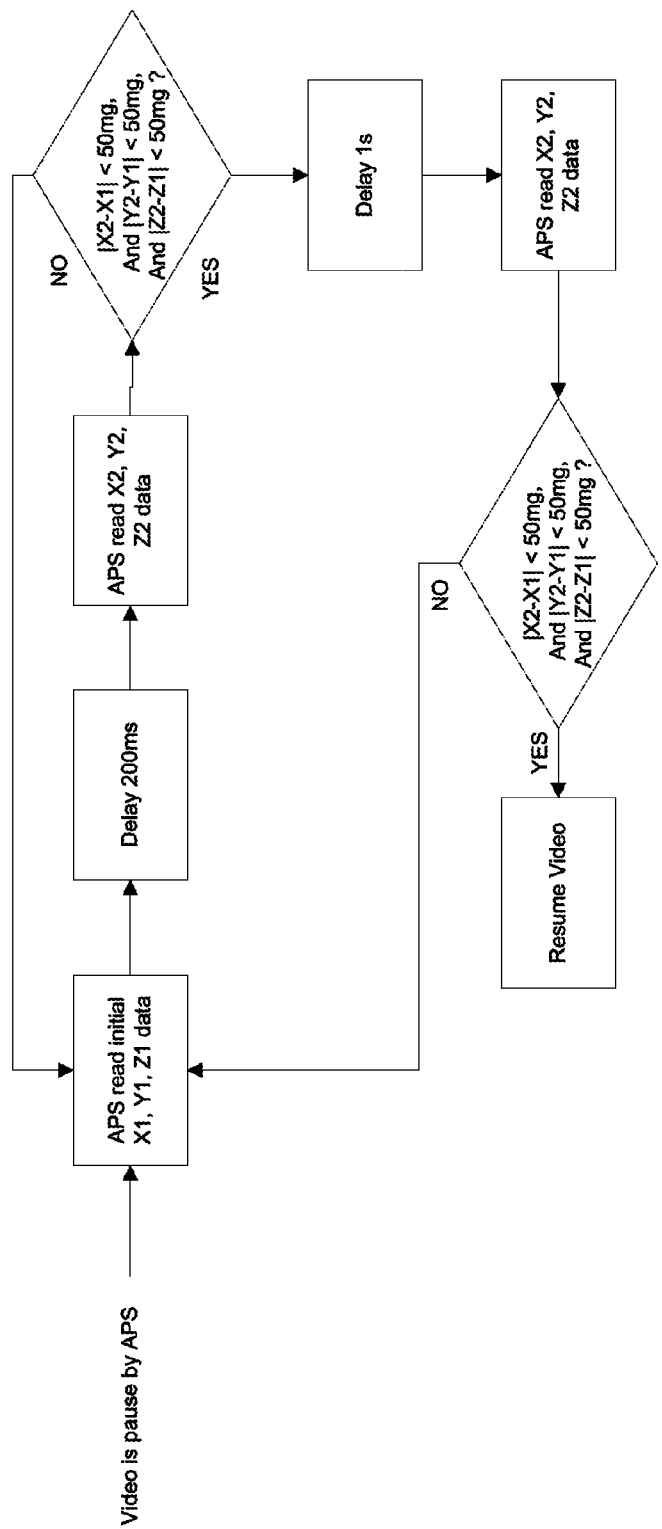
FIG. 19 illustrates a simplified flow diagram showing a software-implemented method for resuming a video playback operation on the portable computing device programmed to use the software-implemented method according to an embodiment of the present invention.

FIG. 19 illustrates a simplified flow diagram showing a software-implemented method for resuming a video playback operation on the portable computing device programmed to use the software-implemented method according to an embodiment of the present invention. This figure shows an example process flow for resuming video playback following the operations of the method flow shown in FIG. 18. As shown, two threshold orientation checks are implemented with a 1 s delay in between. Upon all axes being detected below the threshold in both of these checks, the video playback operation is resumed.

Figure 20:
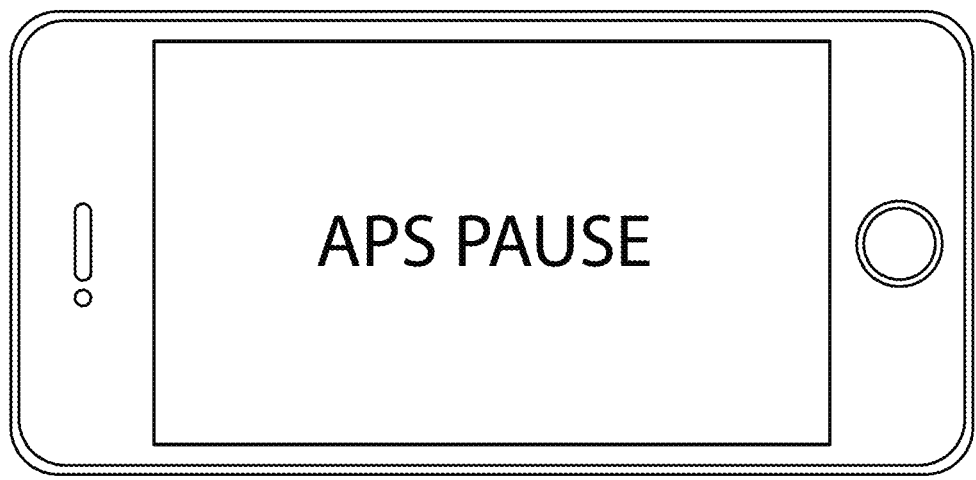
FIG. 20 illustrates a simplified diagram of a portable computing device displaying a visual message indicating a state of a software-implemented method for discontinuing a video playback operation on the portable computing device programmed to use the software-implemented method according to an embodiment of the present invention.

FIG. 20 illustrates a simplified diagram of a portable computing device displaying a visual message indicating a state of a software-implemented method for discontinuing a video playback operation on the portable computing device programmed to use the software-implemented method according to an embodiment of the present invention. As shown, the display of the portable computing device shows an "APS PAUSE" message, indicating that a video playback operation has been halted. Other UI displays may be used and various user triggers, like a double-tap action, can be used to resume the video function as well.

Figure 21:
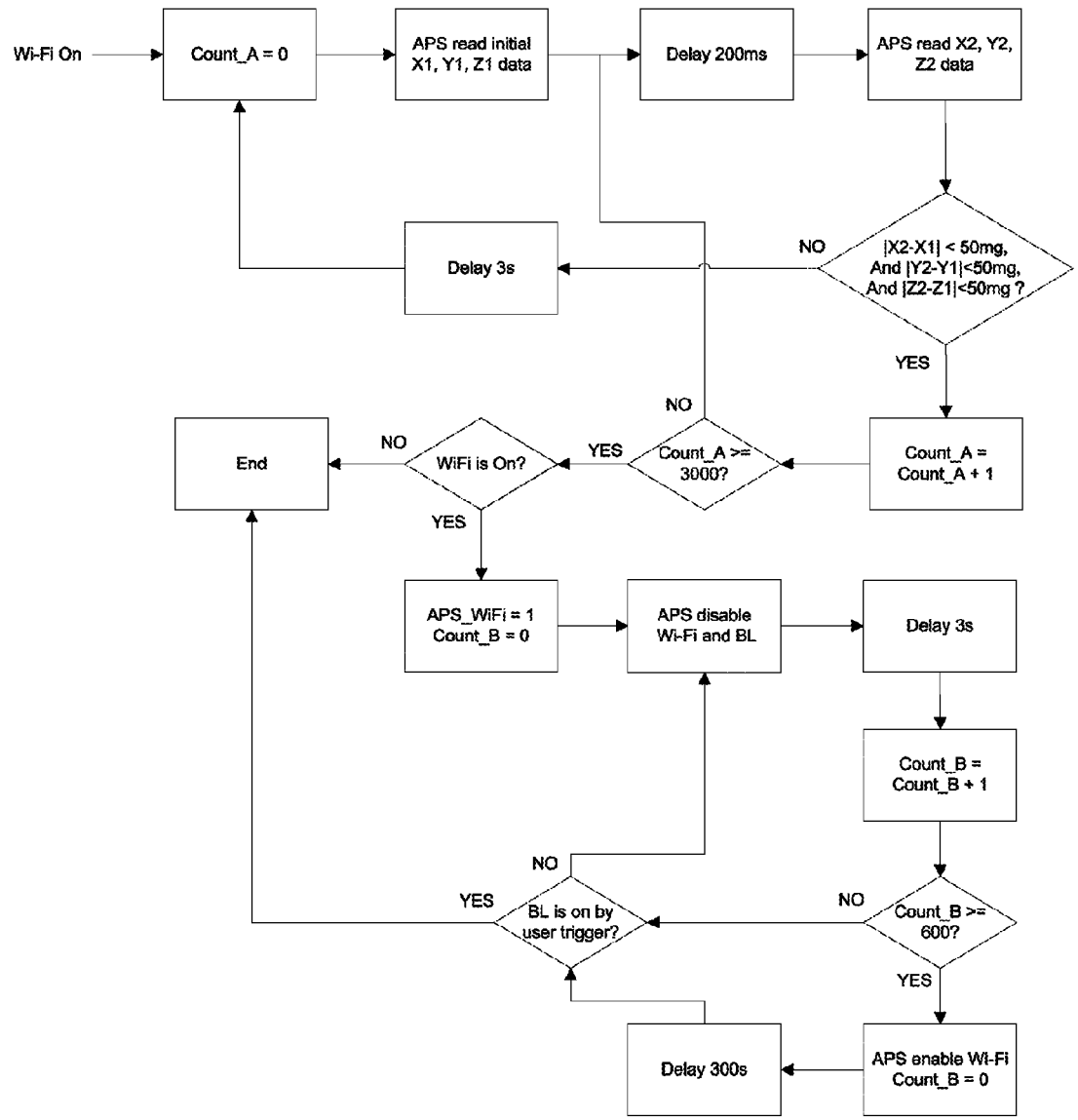
FIG. 21 illustrations a simplified flow diagram showing a software-implemented method for discontinuing Wi-Fi communication operations of the portable computing device programmed to use the software-implemented method according to an embodiment of the present invention.

In a specific embodiment, the first operation can include a timer operation of the portable computing device and the second operation can include Wi-Fi communication operations of the portable computing device. FIG. 21 illustrations a simplified flow diagram showing a software-implemented method for discontinuing Wi-Fi communication operations of the portable computing device programmed to use the software-implemented method according to an embodiment of the present invention. This flow diagram is similar to that of FIG. 7, except that the second function is a telecommunication function instead of an audio function. Process steps similar to those described in FIG. 7 are also present in FIG. 21. Here, discontinuing the second operation includes discontinuing Wi-Fi communication operations of the portable computing device in response to when the orientation changes sensed by the sensor is less than a threshold orientation change, in response to the timer operation indicating a time when the orientation changes being less than the threshold orientation change exceeds a threshold time, and in response to the Wi-Fi communication operations being active.

Figure 22:
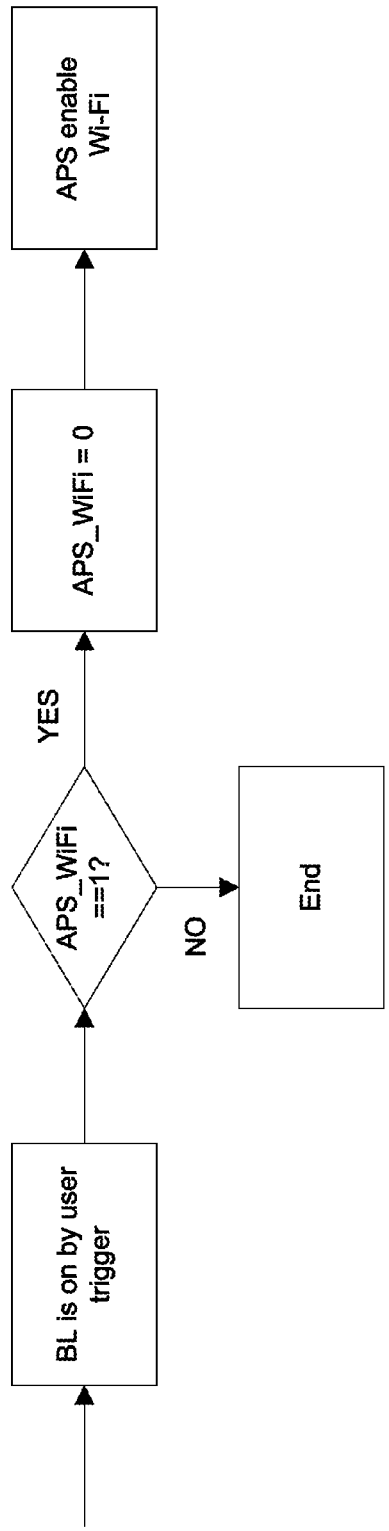
FIG. 22 illustrates a simplified flow diagram showing a software-implemented method for resuming Wi-Fi communication operations of the portable computing device programmed to use the software-implemented method according to an embodiment of the present invention.

FIG. 22 illustrates a simplified flow diagram showing a software-implemented method for resuming Wi-Fi communication operations of the portable computing device programmed to use the software-implemented method according to an embodiment of the present invention. This figure provides a simple process flow to check and resume Wi-Fi communications upon the user triggering the backlight function. As stated previously, various methods may be employed by a user to trigger the re-enabling of the desired operation.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for reducing power consumption in a portable device, the method comprising:
   determining, in a sensor in the portable computing device, orientation changes of the portable computing device;
   determining, in the portable computing device, a status of a first operation of the portable computing device;
   determining, in the portable computing device, a status of a second operation of the portable computing device;
   discontinuing, in the portable computing device, the second operation in response to when the orientation changes of the portable computing device are less than a threshold, and in response to the status of the first operation and the status of the second operation; and
   outputting, on a display of the portable computing device, an indication to a user that the second operation has been discontinued.

2. The method of claim 1 wherein the sensor comprises a MEMS sensor selected from a group consisting of: an accelerometer, a gyroscope, a pressure sensor, and a magnetometer.

3. The method of claim 1
   wherein determining, in the portable computing device, the status of the first operation comprises determining, in the portable computing device whether a display back light operation is inactive; and
   wherein discontinuing, in the portable computing device, the second operation comprises discontinuing, in the portable computing device an audio data output operation.

4. The method of claim 3 wherein discontinuing, in the portable computing device,
   the audio data output is in response to when the orientation changes sensed by the sensor is less than a threshold orientation change for a threshold period of time, in response to the display back light operation being inactive, and in response to the audio data output operation being active.

5. The method of claim 1
   wherein determining, in the portable computing device, the status of the first operation comprises determining, in the portable computing device, whether a display back light operation is active; and
   wherein discontinuing, in the portable computing device, the status of the second operation comprises discontinuing, in the portable computing device, Bluetooth data communication operations from the portable computing device.

6. The method of claim 5 wherein discontinuing, in the portable computing device,
   the Bluetooth data communication operations is in response to when the orientation changes sensed by the sensor is less than a threshold orientation change, in response to the display back light operation being inactive, and in response to the Bluetooth data communication operations being active.

7. The method of claim 1
   wherein determining, in the portable computing device, the status of the first operation comprises determining, in the portable computing device whether a timer operation of the portable computing device has expired; and
   wherein discontinuing, in the portable computing device, comprises discontinuing, in the portable computing device a camera video output operation associated with a display in the portable computing device.

8. The method of claim 7 wherein discontinuing, in the portable computing device,
   the camera video output operation on the display in the portable computing system in response to the orientation changes sensed by the sensor is less than a threshold orientation change, in response to the timer operation exceeds the threshold time, and in response to the camera video output operation being active.

9. The method of claim 1
   wherein determining, in the portable computing device, the status of the first operation comprises determining, in the portable computing device whether a display back light operation of the portable computing device is active;
   wherein discontinuing, in the portable computing device, comprises discontinuing, in the portable computing device data communication operations from the portable computing device; and
   wherein the data communication operations comprises data communication protocols selected from a group consisting of: GPRS (General Packet Radio Service), 3G, 4G.

10. The method of claim 9 wherein discontinuing, in the portable computing device,
    data communication operations in the portable computing device in response to when the orientation changes sensed by the sensor being less than a threshold orientation change, in response to the display back light operation being inactive, and in response to the data communication operations being active.

11. The method of claim 1
    wherein determining, in the portable computing device, the status of the first operation comprises determining, in the portable computing device whether a timer operation of the portable computing device has expired; and
    wherein discontinuing, in the portable computing device, comprises discontinuing, in the portable computing device comprises GPS sensing with the portable computing device.

12. The method of claim 11 wherein discontinuing, in the portable computing device, the
    GPS sensing with the portable computing device is in response to when the orientation changes sensed by the sensor is less than a threshold orientation change, in response to the timer operation indicating a time period when the orientation changes being less than the threshold orientation change exceeds a threshold time, and in response to the GPS sensing being active.

13. The method of claim 1
wherein the sensor comprises a camera;
wherein determining, in the portable computing device, the status of the first operation comprises determining, in the portable computing device whether a display back light operation is active; and
wherein discontinuing, in the portable computing device, comprises setting, in the portable computing device a preset backlight brightness for the display back light operation.

14. The method of claim 13 wherein setting, in the portable computing device, the
the preset backlight brightness setting of the portable computing device is in response to when the camera does not detect a user facing the camera, in response to the display backlight operation being active.

15. The method of claim 1
wherein determining, in the portable computing device, the status of the first operation comprises determining, in the portable computing device whether a timer operation of the portable computing device exceeds a threshold call time; and
wherein discontinuing, in the portable computing device, comprises discontinuing, in the portable computing device a telecommunication operation from the portable computing device.

16. The method of claim 15 wherein discontinuing, in the portable computing device,
the telecommunication operation from the portable computing device is in response to when the orientation changes sensed by the sensor is less than a threshold orientation change, in response to the timer operation indicating a call exceeding a threshold call time, and in response to the telecommunication operation being active.

17. The method of claim 1
wherein determining, in the portable computing device, the status of the first operation comprises determining, in the portable computing device whether a timer operation of the portable computing device exceeds a threshold time; and
wherein discontinuing, in the portable computing device, comprises discontinuing, in the portable computing device a video playback operation on the portable computing device.

18. The method of claim 17 wherein discontinuing, in the portable computing device,
the video playback operation on the portable computing device is in response to when the orientation changes sensed by the sensor is greater than a threshold orientation change, in response to the timer operation indicating a time period when orientation changes being greater than the threshold orientation change exceeds a threshold time, and in response to the video playback operation being active.

19. The method of claim 1
wherein determining, in the portable computing device, the status of the first operation comprises determining, in the portable computing device whether a timer operation of the portable computing device exceeds a threshold time; and
wherein discontinuing, in the portable computing device, comprises discontinuing, in the portable computing device Wi-Fi communication operations of the portable computing device.

20. The method of claim 19 wherein discontinuing, in the portable computing device, the
Wi-Fi communication operations of the portable computing device is in response to when the orientation changes sensed by the sensor is less than a threshold orientation change, in response to the timer operation indicating a time when the orientation changes being less than the threshold orientation change exceeds a threshold time, and in response to the Wi-Fi communication operations being active.

* * * * *